United States Patent [19]
Grasso et al.

[11] 3,712,140
[45] Jan. 23, 1973

[54] WET BULB TEMPERATURE SENSOR

[75] Inventors: Albert P. Grasso, Rockville, Conn.; James K. Stedman, Glastonbury, Conn.

[73] Assignee: United Aircraft Corporation, East Hartford, Conn.

[22] Filed: March 29, 1971

[21] Appl. No.: 128,772

[52] U.S. Cl. .................................................73/338
[51] Int. Cl. ...........................................G01n 25/62
[58] Field of Search.......................73/17, 29, 338

[56] References Cited

UNITED STATES PATENTS 3,253,465    5/1966    Miller....................................73/338
3,196,683    7/1965    Gross.....................................73/338
3,491,583    1/1970    Roussel et al. ........................73/17
1,620,864    3/1927    Benesh...................................73/29

Primary Examiner—Charles A. Ruehl
Assistant Examiner—Herbert Goldstein
Attorney—Laurence A. Savage

[57] ABSTRACT

A temperature sensor for sensing the wet bulb temperature of a gas stream containing vapor is provided by the combination of a housing having a condenser thereon, including cooling means, a wick disposed in the gas stream in fluid connection with the condensing means, and a temperature sensor having its sensing element disposed in the wick.

5 Claims, 3 Drawing Figures

INVENTORS
ALBERT P. GRASSO
JAMES K. STEDMAN
BY Laurence A. Dwoge
ATTORNEY

WET BULB TEMPERATURE SENSOR

BACKGROUND OF THE INVENTION

1. Field of the Invention

This invention relates to a wet bulb temperature sensor and particularly to a temperature sensor for measuring the wet bulb temperature of a flowing gas stream containing vapor therein.

2. Description of the Prior Art

Wet bulb temperature sensors known in the art rely on an external source of liquid to keep the sensor wet in order to measure the wet bulb temperature. This is undesirable in many instances where there is no accessible external liquid supply or where it is impractical to provide an external liquid supply. The ability to wet the temperature sensor by condensing the vapor contained in the gas stream results in an extremely simple, uncomplicated and reliable wet bulb temperature sensor.

SUMMARY OF THE INVENTION

The object of the present invention is to provide a wet bulb temperature sensor which requires no external liquid supply to wet the sensor, and which causes substantially no pressure drop in the gas stream flow.

In accordance with the present invention a wet bulb temperature sensor is provided by the combination of a housing disposed in the air stream, condensing means on said housing for condensing vapor contained in the gas stream, including means for cooling said condensing means, wick means disposed adjacent the condensing means in said gas stream, means for transferring the vapor condensed by said condensing means to said wick means, and temperature sensing means disposed within said wick means whereby the condensed vapor is absorbed by the wick means and wets the temperature sensing means.

Condensed vapor evaporates from the wick means surrounding the temperature sensor into the gas stream. The temperature sensing element disposed in the wick means is cooled in this process due to the heat loss associated with the evaporating water. The cooling process continues until an equilibrium temperature is reached where the heat lost by evaporation equals the heat transferred to it from the gas stream.

The foregoing and other objects, features and advantages of the present invention will become more apparent in light of the following detailed description of a preferred embodiment thereof, as illustrated in the accompanying drawings.

DESCRIPTION OF THE PREFERRED EMBODIMENT

Figure 1:
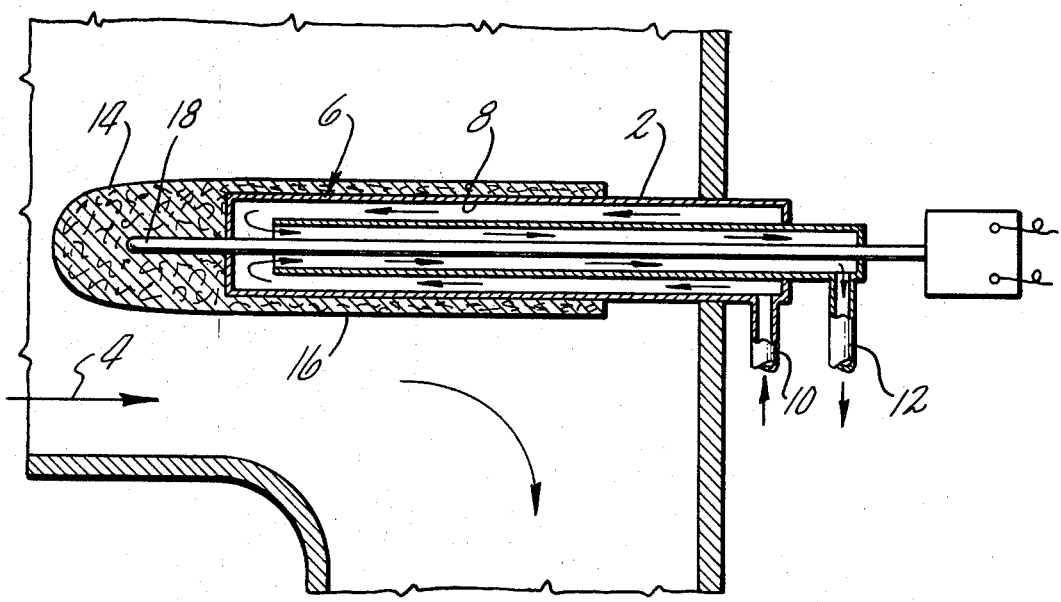
FIG. 1 is a sectioned view of a temperature sensor in accordance with the present invention.

Referring to FIG. 1, there is shown a housing 2 disposed in a gas stream containing vapor, the direction of flow of the stream being indicated by the arrow 4. The direction of the flow is seen to be substantially parallel to the housing which is fabricated from a thermally conductive material. Condensing means 6 on said housing have cooling means 5 comprising a chamber 8 for coolant which enters at inlet 10 and exits at outlet 12. The coolant may be a gas or a liquid at a temperature sufficient to cause the vapor contained in the gas stream to condense at condensing means 6. Wick means 14 may be disposed on said housing, as shown, although they need not be. The wick means could be physically separate from the housing and supported independently in the gas stream. Means 16 for transferring the vapor condensed by the condensing means 6 fluidly connects the wick means 14 with the condensing means 6. Conveniently, the means 16 may be an extension of the wicking material of wick means 14, though it does not necessarily have to be. Temperature sensing means 18 are disposed within the wick means 14. The temperature sensing means may be a thermocouple having a measuring junction disposed in the wick means 14, or it could be any of various thermometers well known in the art, such as, resistance thermometers, thermistors, volume expansion thermometers, bimetallic thermometers and pressure actuated thermometers, for example, having a sensing element disposed in the wick means 14.

In operation, as vapor in the gas stream condenses at condensing means 6, the wick means 14 will absorb the amount of condensed vapor which evaporates into the gas stream from wick means 14, thereby keeping the temperature sensing element wet so that a wet bulb temperature is accurately sensed at all times.

Figure 2:
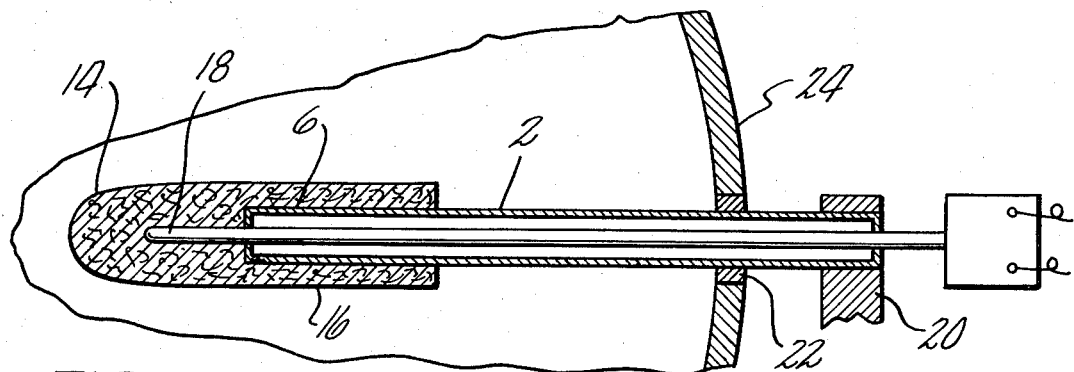
FIG. 2 is a sectioned view of another embodiment of a temperature sensor in accordance with the present invention.

FIG. 2 in which like numerals refer to like components, shows another embodiment of the invention in which the housing 2 may be a copper tube or a heat pipe, for example. In this figure, the gas stream flow may be into or out of the paper, and the housing 2 is, therefore, disposed substantially perpendicular to the gas stream flow. The temperature sensor of the present invention may, in fact, be disposed conveniently in most any orientation with respect to the gas stream flow. However, we have found that it is preferrable that the wick means 14 not be greatly lower in elevation than the condensing means 6 in a gravitational field because it is desirable that the condensed vapor does not run downhill to the wick means 14 as this would saturate the wick means with more condensed vapor than is being evaporated from the wick means 14 into the gas stream. In a nongravitational field such as outer space, the orientation of the wick means 14 relative to the condensing means 6 is irrelevant. In the embodiment shown in FIG. 2, the housing 2 is cooled by a heat sink 20 which may be any type of heat sink known. It may be desirable to provide a thermal insulator 22 between the housing 2 and the wall of the gas stream container 24. The operation of the temperature sensor is the same as that described in reference to FIG. 1.

Figure 3:
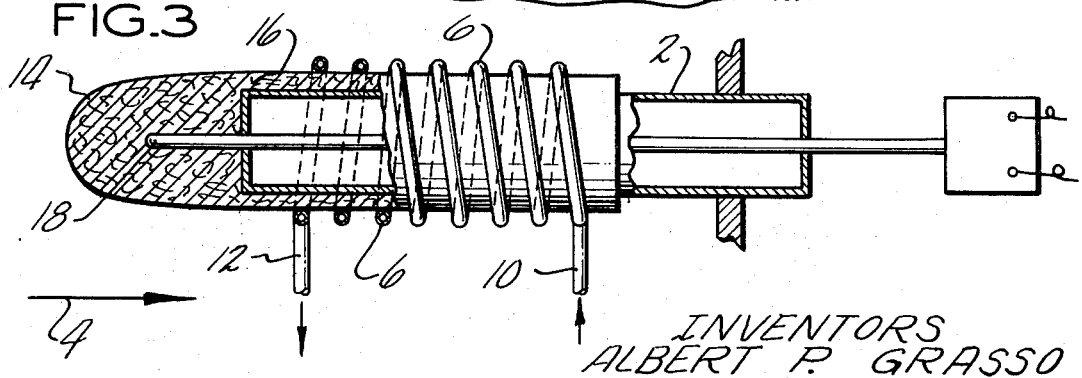
FIG. 3 is a sectioned view of another embodiment of a temperature sensor in accordance with the present invention.

FIG. 3 in which like numerals refer to like components, shows another embodiment of our invention in which the condensing means 6 including the cooling means 5 is a coil of tubing wrapped around the housing 2 as shown. Vapor condenses on the coil 6 and runs onto the wick extension 16 which transfers the condensed vapor to the wick means 14 surrounding the temperature sensor 18. The operation of this embodiment is the same as that described with reference to FIG. 1 and FIG. 2.

There has thus been described a temperature sensor for accurately sensing the wet bulb temperature of a gas stream containing a vapor in accordance with the present invention. It will be understood by those skilled in the art that various means for cooling the condensing means, various means for transferring the vapor condensed from the condensing means to the wick means, and various types of temperature sensing means may be substituted for the ones shown, and that various changes and omissions may be made therein without departing from the spirit and scope of the invention.

What we desire to secure by Letters Patent of the United States is:

1. A temperature sensor for sensing the wet bulb temperature of a gas stream containing vapor, comprising:
    a housing disposed in the gas stream including a condensing section for condensing vapor contained in the gas stream thereon;
    wick means disposed on said housing and contiguous with said condensing section; and
    temperature sensing means disposed within said wick means whereby the vapor in the gas stream which is condensed by said condensing means is absorbed by said wick means and wets said temperature sensing means.

2. A temperature sensor as defined in claim 1 wherein said housing is disposed substantially parallel to the direction of flow of the gas stream and oriented so that the flow of the gas stream passes over said wick means and then over said condensing section.

3. A temperature sensor as defined in claim 1, wherein said housing is disposed substantially perpendicular to the direction of flow of the gas stream.

4. A temperature sensor as defined in claim 1, wherein said temperature sensing means is a thermocouple having its measuring junction disposed in said wick means.

5. A temperature sensor as defined in claim 1, wherein said temperature sensing means is a thermometer having its sensing element disposed in said wick means.

* * * * *

PO-1050
(5/69)

UNITED STATES PATENT OFFICE
CERTIFICATE OF CORRECTION

Patent No. 3,712,140         Dated January 23, 1973

Inventor(s) Albert P. Grasso and James K. Stedman

It is certified that error appears in the above-identified patent and that said Letters Patent are hereby corrected as shown below:

Column 1, after line 1, insert:

-- The invention herein described was made in the course of or under a contract or subcontract thereunder, with the Department of the Air Force. --

Signed and sealed this 7th day of May 1974.

(SEAL)
Attest:

EDWARD M. FLETCHER, JR.
Attesting Officer

C. MARSHALL DANN
Commissioner of Patents